United States Patent
Randall et al.

(10) Patent No.: US 6,572,804 B2
(45) Date of Patent: Jun. 3, 2003

(54) METHOD FOR MAKING BUILDING PANELS HAVING LOW EDGE THICKNESS SWELLING

(75) Inventors: James Randall, Cloquet, MN (US); Harden Christopher Wren, Lufkin, TX (US); Earl Phillips, Lufkin, TX (US)

(73) Assignee: Borden Chemical, Inc., Columbus, OH (US)

( * ) Notice: Subject to any disclaimer, the term of this patent is extended or adjusted under 35 U.S.C. 154(b) by 100 days.

(21) Appl. No.: 09/963,711

(22) Filed: Sep. 27, 2001

(65) Prior Publication Data

US 2002/0084548 A1 Jul. 4, 2002

Related U.S. Application Data

(60) Provisional application No. 60/240,976, filed on Oct. 18, 2000.

(51) Int. Cl.[7] ................................................. B29B 13/10
(52) U.S. Cl. ....................... 264/115; 264/119; 264/120; 264/126
(58) Field of Search ................................. 264/109–128

(56) References Cited

U.S. PATENT DOCUMENTS

| | | |
|---|---|---|
| 1,135,610 A | 4/1915 | Pearsall et al. |
| 1,358,394 A | 11/1920 | Redman et al. |
| 3,939,532 A | 2/1976 | Wiegand |
| 3,978,264 A | 8/1976 | Tarbell et al. |
| 4,194,997 A | 3/1980 | Edler |
| 4,831,089 A | 5/1989 | Flodman et al. |
| 4,937,024 A | 6/1990 | Hickson |
| 5,002,713 A | 3/1991 | Palardy et al. |
| 5,482,666 A | 1/1996 | Larsson |
| 5,520,777 A * | 5/1996 | Shisko ........................ 162/13 |
| 5,611,882 A | 3/1997 | Riebel et al. |
| 5,629,083 A | 5/1997 | Teodorczyk |
| 5,643,376 A | 7/1997 | Gerhardt et al. |
| 5,733,396 A | 3/1998 | Gerhardt et al. |
| 5,763,559 A | 6/1998 | Black |
| 5,902,442 A * | 5/1999 | Phillips et al. ............... 156/296 |
| 5,913,990 A | 6/1999 | Kramer |
| 5,980,798 A | 11/1999 | Bonomo et al. |
| 5,993,709 A | 11/1999 | Bonomo et al. |
| 6,054,081 A | 4/2000 | Bielfeldt |

FOREIGN PATENT DOCUMENTS

| | | |
|---|---|---|
| CA | 989289 | 5/1976 |
| CA | 1135610 | 11/1982 |

* cited by examiner

*Primary Examiner*—Stephen J. Lechert, Jr.
(74) *Attorney, Agent, or Firm*—Stevens, Davis, Miller & Mosher, L.L.P.

(57) ABSTRACT

An improvement to existing board manufacturing process which utilize lignocellulose particles is described wherein the adhesive to be applied as a binder is at least partly applied before the particles are dried. Using the invention improvement in resin application rates without increase in the water content of the particles fed to a press is achieved. Reduction in edge thickness swelling has been achieved.

14 Claims, 1 Drawing Sheet

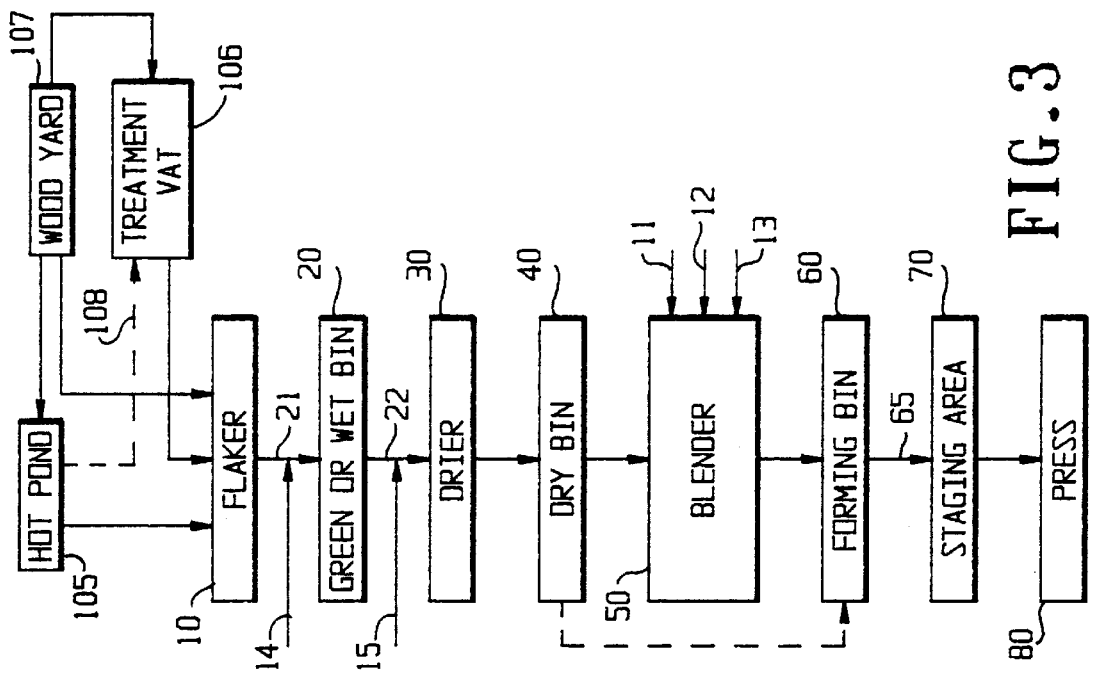
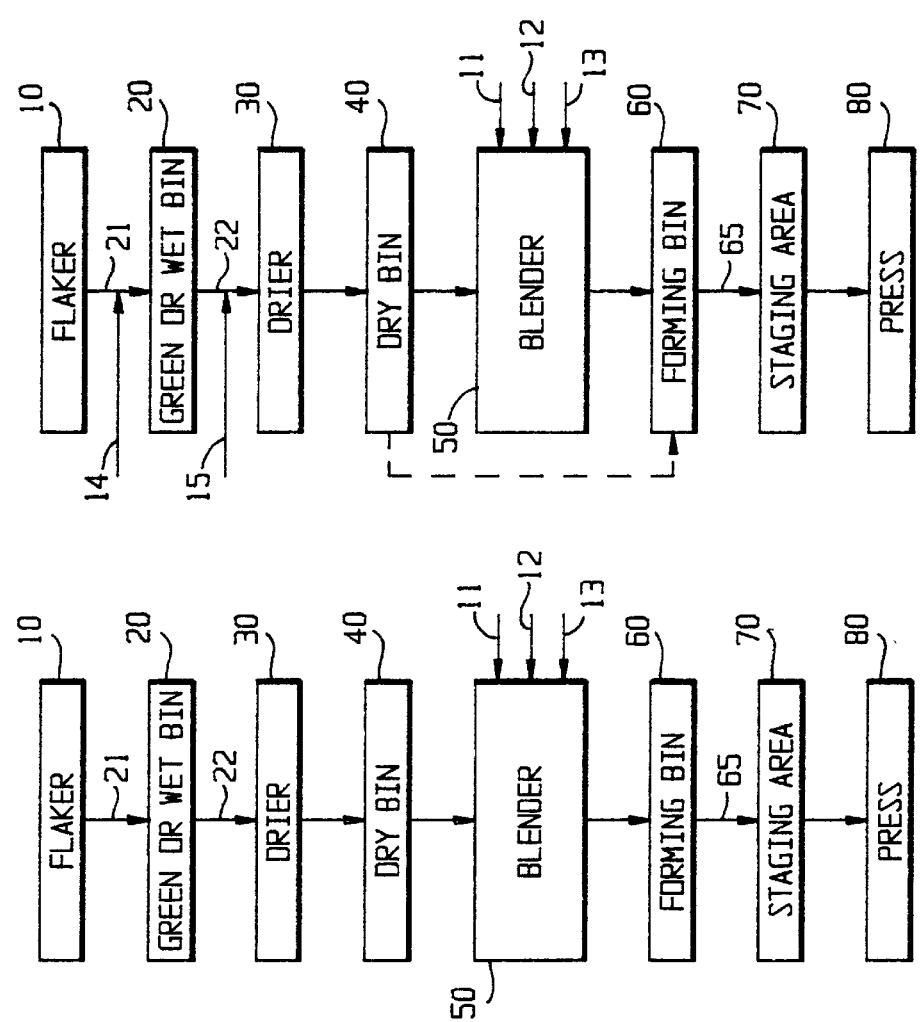
FIG. 3
FIG. 2
FIG. 1 (PRIOR ART)

METHOD FOR MAKING BUILDING PANELS HAVING LOW EDGE THICKNESS SWELLING

This application claims benefit of Provisional Application 60/240,976, filed Oct. 18, 2000.

BACKGROUND OF THE INVENTION

1. Field of the Invention

A method for making particle board having low edge thickness swelling utilizing an adhesive, such as a phenol formaldehyde (PF) resin, is disclosed. The method avoids emissions of ammonia and produces low $NO_x$ emissions by tailoring the adhesive used to the process conditions. Apparatus is also provided such that the application of the resin to lignocellulosic particles is effected in a particular sequence which enables the production of building boards having low edge thickness swelling with no ammonia emissions and low $NO_x$ emissions. The resulting lignocellulosic particle boards have novel and unexpected properties.

2. Description of the Related Art

The manufacture of building board of particles adhered by an adhesive such as those obtained by PF binders is a well established art, as described, for example, in U.S. Pat. No. 1,358,394 to Redman et al issued in 1920 (incorporated by reference in its entirety). Therein is described the method of producing a phenolic condensation product by combining a phenol substance, such as phenol, with an active methylene substance, such as formaldehyde, and after mixing with a filler, may be molded in hot presses.

PF resins had become the adhesives of choice for manufacturing durable heat- and moisture-resistant wood based composites. They are low in cost and provide the high strengths required for structural applications.

However, as organic solvents became unacceptable in the building panel production processes, due to health, environmental, and flammability considerations, phenolic wood binders were provided as either aqueous resoles or spray-dried resole powders. The powder form is limited in its ability to provide properties because a secondary binder must be applied to cause the PF powder to adhere to a wood surface until the pressing step. Generally, the secondary binders are capable of retaining only about 3 wt % PF powder on the surface of the wood particles. While this amount may be sufficient for many commodity panels, it is often insufficient for developing the high strength or low moisture responses required of high value speciality applications.

On the other hand, liquid resins, such as aqueous resoles can be applied at much higher levels. At these higher-levels, they are much- more capable than powders for developing the high strengths and low moisture responses required of the speciality panel products. Though more flexible than powders, the aqueous resoles are also limited in their abilities due to the effects of the additional moisture that is carried into the system, since as the amount of aqueous resin increases, so does the weight of the aqueous vehicles for the resin. This added moisture slows the cure of the resin and may inhibit development of full cross-linking, thereby adversely diminishing the strength of the adhesive. The moisture also softens the wood substrate reducing pressure between mating wood surfaces. Furthermore, as presses heated above the boiling point of water are commonly used in the board industry to increase production speeds by accelerating the cure of the binder, the existence of additional moisture (>12%) may create high internal steam pressures during the hot pressing, leading to blows and sub-optimal adhesive contributions due to resin migration in response to steam flow. In addition, the heat applied in prior art processes increased the emission of noxious gases, such as ammonia, and if the plant is provided with a Regenerative Thermal Oxidizer (RTO), the ammonia may be converted to $NO_x$. If the plant does not have an RTO, or some other heat system that puts resin emissions through a burner, there will be no $NO_x$ formed, although in that case ammonia would be emitted to the atmosphere. Thus, although the increased addition of resin via an aqueous vehicle may lead to better properties, the process is inherently limited as a result of the concurrent moisture additions in the form of the aqueous vehicle for the resin.

The lignocellulosic particles commonly utilized in many panel producing method, such as those for making oriented strand board (OSB), typically used in sub-flooring, roof sheathing, siding and wall sheathing, along with other specialty applications, already contains moisture inherently, or introduced during preliminary processing steps.

For example, when logs of wood enter the manufacturing facility, they are typically placed in a vat or "hot pond" to help thaw the wood and/or remove dirt and grit from the logs before debarking the same. Alternatively, the logs may be retained in an outside storage lot before being brought into the manufacturing facility for flaking. Each of these techniques introduces moisture into the logs.

Debarked logs are "flaked" in flakers to provide flakes having certain properties, such as specific length, width and thickness. This results in "green flakes." Green flakes are undried and typically have moisture contents between 20 and 80 wt % moisture content on an "oven-dried" basis, i.e., the weight of the flakes after oven drying.

Typically, the green flakes are stored in a "green bin" or "wet bin" before drying to prespecified specified manufacturing moisture content. The green flakes thereafter are sent to driers to dry the flakes to a typical moisture content of about 2 to about 10 wt %. Dried flakes are stored in "dry bins" or "dry flake bins" until blended.

Blending is where adhesive (binders), catalyst, water and wax (emulsion or slack) are typically added to the dried flakes. Such binders are typically PF resole resin or pMDI. PF resin binders are typically applied at rates between 1.7%–8.0% (based on a wt % of solid binder to oven-dry wood). The blended flakes are transferred to forming bins, which are used to meter the flakes onto a forming surface, such as a forming belt. The forming bins contain "orienter rolls or discs" which orient the flakes in either the direction of the forming line or transverse to the direction of forming line travel. The forming bins also control the limit of the amount of flakes falling onto the forming surface, which controls the finished panel density, which is usually between 36 and 50 pounds per cubic foot.

The forming surface travels under forming heads creating a continuous mat of oriented flakes. These mats are typically cut to specific lengths and loaded onto a "pre-loader" or loading cage" which is a staging area for a full "press-load" of mats.

The mats are pressed to specific thickness and the resin cured to result in a finished panel. The conditions of elevated temperature, pressure, and time can be varied to control the cure time. Catalyst can also be introduced during the processing steps to optimize the pressing times or to shorten the overall pressing time.

The finished panels are thereafter usually cut to size, stacked, painted and packaged for delivery to the customer.

Attempts have been made to reduce press time by preheating the flakes on the forming surface, such as disclosed in U.S. Pat. Nos. 5,643,376 and 5,733,396 to Gerhardt et al (incorporated by reference in their entirety). Therein, a particle mat is heated by concurrently passing through the mat treatment air coming from an air-conditioning system and having a predetermined moisture content and dew point such that the mat is preheated to a predetermined temperature while liquid in the treatment air is allowed to condense in the mat to, at most, a maximum liquid content. Other attempts to preheat the mat employs the use of microwaves; See, U.S. Pat. No. 5,913,990 to Kramer, or steam; See, U.S. Pat. No. 5,993,709 to Bonomo, or hot-air; See, U.S. Pat. No. 6,054,081 to Bielfeldt, prior to the pressing step (all patents are herein incorporated by reference in their entirety).

Other attempts for introducing an adhesive into green flakes can be found in Canadian Patent 1,135,610, issued in 1982. Processes for introducing adhesive into green flakes, as well as into the same flakes after drying, was disclosed in Canadian Patent 989,289, issued in 1976.

However, none of these processes teach a method of introducing an adhesive, in the form of either a powder or an aqueous form, to the "green flakes," i.e., before the flakes are initially dried to a predetermined moisture content, with no ammonia and low $NO_x$ emissions occurring during one of the subsequent drying and/or pressing steps.

SUMMARY OF THE INVENTION

A method is provided for introducing a powder or aqueous resin adhesive, preferably a PF resole binder, to green flakes before they are dried, with little or no formaldehyde or ammonia emissions and low $NO_x$ emissions.

The invention also provides an apparatus suitable for forming building panels, particularly OSB panels from green particles by means of a hot press wherein at least a part of the resin binder is introduced, in aqueous or powder form, prior to the drying of the green particles.

Building panels having high strength and low edge swells and formed of lignocellulosic particles and a PF adhesive, having low $NO_x$ emissions and little or no ammonia or formaldehyde emissions when dried and/or pressed under heat and pressure are provided.

BRIEF DESCRIPTION OF THE DRAWINGS

FIG. 1 is a flow diagram of a typical prior art OSB making process.

FIG. 2 is a flow diagram of a building panel manufacturing process according to the invention.

FIG. 3 is a flow diagram from the wood yard through a building panel manufacturing process in an alternative embodiment of the invention.

DETAILED DESCRIPTION OF THE PREFERRED EMBODIMENTS

As shown in FIG. 1, is a flow chart of a typical prior art process for making OSB. The flaker 10 forms the flakes, discharging the flakes via a take-away conveyor or drop chute 21 to the "green" or "wet bin" 20. The discharge from the "green" or "wet bin" 20 to the dryer 30 can be via doffing rolls or drop chutes 22. The dried flakes exiting dryer 30 can be stored in dry bin 40 or fed directly to blender 50 where they are mixed with other compounds, such as an adhesive 11, wax 12, catalyst 13, etc. After mixing, the mixture is discharged to a forming bin 60, fed by conveyors, such as forming belt 65 to a staging area 70. From the staging areas 70 mats of particles, adhesive, water, and other components are fed to press 80 where they are treated, under heat and pressure, to consolidate the particles and cure the adhesive, typically a PF resin.

We have found that the total application of resin, to the blender 50 as in the prior art, which inherently introduces water, in the form of the aqueous resin component, is deleterious to the formation of building panels for high value uses. After study, we have found that at least a portion of the adhesive can be applied to the lignocellulosic particles before the particles are dried. Convenient sites for application are shown in FIGS. 2–3. For example, in FIG. 2, the flakes being discharged from flaker 10 can have resin applied as they exit the flaker via a take-away conveyor or drop chute 21. Resin application 14 can be by spray nozzles (air assisted or non-air assisted) (not shown) or through a conventional spinner disc atomizer (not shown). Other methods of applying resin such as falling curtain may be employed so long as the choice of application ensures that the desired amount of resin is applied uniformly to the flakes. Dilution of the resin optimizes resin distribution. It is typical in the wood industry to run resins from 100% solids (powder resole resins) to 15% diluted resin solids. There is significant data to show that powder resins provide excellent distribution when compared to the liquid resins.

This application rate at resin application 14 can be 0% (as in the conventional process) to about 30 wt %.

However, typical resin application of PF resins can result in at least one of several types of deleterious emissions. Either formaldehyde, ammonia or $NO_x$, or each, can be emitted during such a process during one or both of the drying or pressing steps of the process necessary to transition a mixture of particles and adhesive into a consolidated mat of parties bonded by an adhesive.

Even when an additional or alternative resin application is performed upon exit of the green flakes from green or wet bin 20, there can be the deleterious emission of ammonia, or $NO_x$ gases upon passage through an RTO or other emissions burner. The discharge of green or wet bin 20 is usually via doffing rolls and drop chutes 22. Application of a resin 15 can conveniently be applied at this point. The application points in the present invention can be varied based on several factors of the process design, including chute design, wood flow over doffing rolls, distance and space availability for the application hardware, etc.

The amount applied at application of resin 15 can be the same or different from that applied at other locations in the process, e.g., to that applied at 14. The type of resin applied can also vary, e.g., powder at 14, aqueous solution at 15 (or 11).

In the alternative embodiment of FIG. 3, resin application may commence as early as in the hot pond 105, or treatment vat 106 by addition of resin into these areas. Alternatively, resin may be applied as the logs are transported from wood yard 107 to flaker 10, or to hot pond 105. Alternatively, logs can be sent from the wood yard 107 to special treatment vat 106 for resin application before being fed to flaker 10. In another alternative, after thawing the logs in hot pond 105, the logs may be sent to treatment vat 106 (via the route shown in dotted line 108 in FIG. 3) for resin application.

Although we have specifically illustrated resin application at one or more points prior to drying, it would be within the skill of the worker in the art, upon reading the disclosure of the invention, to apply resin prior to, during or after flaking, in the green or wet bin, or in multiple points along the process in order to provide the required resin. Still further, it is possible to supplement the present process of resin application after the dryer, by providing additional resin prior to the drier according to the invention.

We have found a way in which the emission of free formaldehyde, ammonia and/or $NO_x$ can be reduced whether the resin, used as an adhesive, is applied prior to the drier, subsequent to the drier, but before the pressing step and/or both prior to the drier and subsequent to the drier, but prior to the pressing step.

Our discovery lies in our recognition that the prior art processes, during curing of the PF resin, produced an ammonia emission, due to the presence of urea, usually added subsequent to formation of the PF resin, as a component of the adhesive which was thought to eliminate free-formaldehyde emissions.

The presence of free urea, added to a PF resin, has been found to release ammonia in both the drying step, as well as in the pressing step when used in prior art processes when resin is added after the drying, but before the pressing step; before the drying step or when resin is added both before and after the drying step.

We have found that by adding urea to a PF resin, followed by the addition of formaldehyde, forming methyol urea, which, when used in the present process, is less likely to give ammonia (or $NO_x$ if emissions are fed to an RTO or other burner) than a PF resin to which urea alone has been added.

The presence of methyol urea, with a PF resin, can then be used as the adhesive which is added before the drying step, after drying, but before pressing, or both, without creating an emission of free-formaldehyde as well as reducing the emission of ammonia (or $NO_x$) in either the drying or pressing steps.

The total amount of resin in the final product includes that added prior to the drier, e.g., at the hot pond 105, and/or treatment vat 106, in the flaker 10 and/or green or wet bin 20, resin application 14, application of resin 15 and adhesive 11, and can be adjusted so that the new building panels made by the process of the invention maintains the current commodity board densities of 37 to 43 $lb/ft^3$. However, it is possible to increase the total resin content by the present invention to exceed those densities without introducing excessive moisture into the blended particles or increasing formaldehyde, ammonia or $NO_x$ emissions.

Current cure times can be maintained even with higher resin contents so that production rates and volumes are not hampered. While press temperatures between 300° and 460° F. can be used, desired targets are still between 380° and 430° F. The lower press temperatures generally do not allow for good mat consolidation and heat transfer within the mat as it is being pressed. However, it is also possible to combine the prior art steps of preheating the mats before pressing with the resin addition prior to heating of the flakes, which occurs prior to mat formation. Generally, temperatures exceeding 430° F. present a fire hazard in the current mill environments.

In other embodiments according to the invention, the application of the resin prior to the drying makes it possible to eliminate the blending system completely. This is shown by the dotted line in FIGS. 2–3.

Industrialization according to the alternative embodiment could save significant capital and maintenance costs associated with installation and upkeep of the current blending systems. In another alternative, it is also possible to move the blender 50 and its associated adhesive 11, wax 12 and/or catalyst 13, to a point upstream of the drier, e.g., between the flaker 10 and the green or wet bin 20 or, alternatively, after the green or wet bin 20, but before dryer 30.

It is also possible to eliminate the wax 12 from the process altogether. It is apparent that such elimination would achieve significant savings and, furthermore, board density could be reduced to a lower spectrum of from about 28 to about 32 $lb/ft^3$. While we have described the particles as lignocellulosic, we do not envision that the form of particles is limited to strands as it is equally suitable for particles in the form of long or short fibers, flakes, chips and/or combinations thereof with veneers. The methods of the invention are suitable over a wide range of wood species and are suitable for all woods currently in use in the panel making industry.

Resin optimization could be achieved by changing molecular weight (wt. Avg. MW), viscosity, and resin solids content. Catalysts, both internal and external, can be applied at various times, e.g., resin can be applied before dryer, but catalyst could be applied at blender and vice versa.

Suitable adhesives, as substitutes for, or in addition to, the phenol formaldehyde previously mentioned could include other thermosetting resins, so long as reduced ammonia and/or $NO_x$ emissions are achieved.

When the lignocellulose particles are in the form of strands, the strands may be up to 12 inches in length and may be oriented to form oriented strandboard (OSB). Other products which may be manufactured according to the invention include high density fiberboard (HDF), medium density fiberboard (MDF), chipboard, laminated veneer lumber (LVL) and plywood.

Although we have described a "flaker" to process the logs into smaller pieces, the use of a "peeler" to form discrete layers or plys useful in manufacturing plywood or composite products, such as laminated veneer lumber (LVL) can be substituted for flaker 10 and are within the scope of the invention.

In all cases, the resin to be applied to the lignocellulose is applied before the lignocellulose is dried, such as before the drier, after, or in, the green or wet bin, between the green or wet bin and flaker or peeler, at the exit of the flaker or peeler, and even in the hot pond, or treatment vat for treating logs (either debarked or whole), with a preliminary application of resin. Though less effective than applying the resin to lignocellulose whose surface area has already been increased (e.g., by flaking or peeling), the invention is applicable to all phases of board preparation, provided that at least some resin is applied upstream of the drier, or when applied at more than one location is applied at least before the step of applying heat and pressure to a mass of particles and adhesive.

The invention has applicability to all known board manufacturing processes, including those using heated press platens, steam injection, catalyst injection, microwave or radio frequency (RF), heating and continuous and semi-batch pressing operations.

The invention is further explained by reference to the following examples.

EXAMPLE 1

Boards were made according to the specifications of Table 1 and tested for properties.

TABLE 1

| Board | Furnish | Density pcf | pre-treated moisture | pre-treat resin diluted 50:50 w/ water | % pre-treat RT solids basis | Face Resin | % Face RT | Core Resin | % Core RT |
|---|---|---|---|---|---|---|---|---|---|
| Control 1 23/32 | Aspen | 43.0 | --- | --- | --- | OS-745E | 3.5 | OS-408 | 3.5 |
| Test 1 - 23/32 | Aspen | 43.0 | dry - 11% | OS-707 | 20.0 | OS-745E | 3.5 | OS-408 | 3.5 |
| Control 2 - 23/32 | Aspen | 38.0 | --- | --- | --- | OS-745E | 4.0 | OS-408 | 5.0 |
| Test 2 - 23/32 | Aspen | 38.0 | dry - 11% | OS-707 | 15.0 | OS-745E | 4.0 | OS-408 | 5.0 |
| Control 3 - 23/32 | Aspen | 38.0 | --- | --- | --- | OS-745E | 4.0 | OS-406 | 5.0 |
| Test 3 - 23/32 | Aspen | 38.0 | dry - 11% | OS-703A | 10.0 | OS-745E | 4 0 | OS-406 | 5.0 |
| Test 4 - 23/32 | Aspen | 38.0 | dry - 11% | OS-803 | 10.0 | OS-745E | 4.0 | OS-406 | 5.0 |
| Control 4 - 23/32 | Pine | 38.0 | green - 45% | OS-703A | 15.0 | OS-745E | 4.0 | OS-406 | 5.0 |
| Test 5 - 23/32 | Pine | 38.0 | green - 45% | OS-35D | 15.0 | OS-745E | 4.0 | OS-406 | 5.0 |
| Test 6 - 23/32 | Pine | 38.0 | green - 45% | OS-35D | 15.0 | OS-745SE | 4.0 | OS-406 | 5.0 |
| Test 7 - 23/32 | Pine | 42.0 | green - 45% | OS-703A | 20.0 | OS-745E | 4.0 | --- | --- |
| Test 8 - 7/16 | Pine | 42.0 | green - 45% | OS-703A | 20.0 | --- | --- | --- | --- |

| Board | % 50S wax Face | % 50S wax Core | Press Temp | Total Cycle | IB psi | % WA | % TS | % CS |
|---|---|---|---|---|---|---|---|---|
| Control 1 23/32 | 1.0 | 1.0 | 420° F. | 300 sec | NT | 40.8 | 14.6 | 5.9 |
| Test 1 - 23/32 | 10 | 10 | 420° F. | 300 sec | NT | 21.8 | 1.7 | 0.4 |
| Control 2 - 23/32 | --- | 1.0 | 420° F. | 300 sec | 31.1 | 52.7 | 15.7 | 6.3 |
| Test 2 - 23/32 | --- | 1.0 | 420° F. | 300 sec | 55.0 | 34.6 | 5.0 | 2.5 |
| Control 3 - 23/32 | --- | 1.0 | 420° F. | 300 sec | 44.6 | 33.3 | 10.6 | 6.4 |
| Test 3 - 23/32 | --- | 1.0 | 420° F. | 300 sec | 102.3 | 25.7 | 5.6 | 2.9 |
| Test 4 - 23/32 | --- | 1.0 | 420° F. | 300 sec | 64.8 | 25.7 | 5.6 | 1.9 |
| Control 4 - 23/32 | --- | 1.0 | 420° F | 300 sec | 82.0 | 55.9 | 18.4 | 10.3 |
| Test 5 - 23/32 | --- | 1 0 | 420° F. | 300 sec | 159.6 | 46.5 | 7.5 | 5.8 |
| Test 6 - 23/32 | --- | 1.0 | 420° F. | 300 sec | 139.6 | 53.4 | 7.4 | 6.7 |
| Test 7 - 23/32 | --- | --- | 420° F. | 360 sec | 124.5 | 65.8 | 13.1 | 5.5 |
| Test 8 - 7/16 | --- | --- | 420° F. | 180 sec | 113.5 | 60.1 | 10.3 | 6.2 |

Notes:
1) NT = Not tested
2) Dashed Lines (---) = No resin added
3) OS-803 in test #4 is the light colored face resin
4) Tests 1–4 all used aspen furnish that was already dried to 11% MC. This was then pre-treated and brought back up to ~40% MC.
5) Tests 5–8 all used "fresh" green pine furnish at 45% MC that was pre-treated and brought to 50+% MC.
6) Note the center swell vs. edge swell in Test #6.
7) Test #7 was pre-treated with 50:50 703A:water and then only face layers were sprayed after drying - no core resin added.
8) Test #8 was a 7/16th board pre-treated and had no additional core or face resin added.
IB—Internal Bond. % WA = Water absorption. % TS = Thickness Swell. % CS = % Center Swell.

All parts or percentages used throughout this specification is by weight or weight percent unless otherwise indicated.

EXAMPLE 2

The following data demonstrate the effect of post addition of formaldehyde to a PF resin to which urea has been added on the ammonia emissions when the resulting adhesive was subjected to a temperature increase.

TABLE 2

Effect of Post Additions of Formaldehyde on Ammonia Emissions of

| Sample | MR F/U | Resin Wt, g | (NH$_4$ Imp. Soln Wt, g | Conc. Ug/ml | NH$_3$ Total ug | % X E-3 |
|---|---|---|---|---|---|---|
| 1 | 0.5 | 5.1196 | 70.8327 | 2.1 | 148.75 | 2.9 |
| 1A | 0.5 | 5.0560 | 75.5086 | 2.4 | 181.22 | 3.6 |
| | | | | | Avg | 3.2 |
| 2 | 0.75 | 5.0961 | 73.6180 | 0.9 | 66.26 | 1.3 |
| 2A | 0.75 | 5.0739 | 70.7759 | 0.5 | 35.39 | 0.7 |
| | | | | | Avg | 1.0 |
| 3 | 0.85 | 5.0591 | 73.8229 | 0.5 | 36.91 | 0.7 |

TABLE 2-continued

Effect of Post Additions of Formaldehyde on Ammonia Emissions of

| Sample | MR F/U | Resin Wt, g | (NH$_4$ Imp. Soln Wt, g | Conc. Ug/ml | NH$_3$ Total ug | % X E-3 |
|---|---|---|---|---|---|---|
| 3A | 0.85 | 5.0621 | 71.1275 | 0.3 | 21.34 | 0.4 |
|    |      |        |         |     | Avg   | 0.6 |
| 4  | 1    | 5.0481 | 71.7689 | 0.4 | 28.71 | 0.6 |
| 4A | 1    | 5.0922 | 73.5366 | 0.2 | 14.71 | 0.3 |
|    |      |        |         |     | Avg   | 0.4 |
| 5  | 0, Control | 5.0874 | 72.1673 | 17.5 | 1262.93 | 24.8 |
| 5A | 0, Control | 5.0590 | 76.6947 | 12.3 | 943.34  | 18.6 |
|    |      |        |         |     | Avg   | 21.7 |

Procedure:
1. PD-112 was heated to 50° C. and urea was added at 50° C.
2. Formaldehyde was added to the resin at 35–37° C.
3. After standing overnight at room temperature, the resin samples were adjusted to 35% solids.
4. The 35% solids reins samples were tested for ammonia evolution by heating at 151° C. for 15 minutes. Each sample was tested in duplicate.

wherein MR is the "molar ratio" and the units of "%XE-3" are representative of the value, e.g., 2.9×10$^{-3}$ or 0.0029%. Sample number 5 is a control with no formaldehyde added to the PF resin to which urea has been added.

We have also evaluated the effect of delayed pressing on resin applied to lignocellulosic particles. Such a delay in pressing can occur due to mechanical breakdown of one or more components of the manufacturing process, e.g., a breakdown of the conveying system on the press. In such cases, the resin and particles may be in contact for an extended period, e.g., up to three days, as over a weekend when the breakdown occurred Friday and production did not recommence until the following Monday. The following examples simulate what may happen if pre-treatment resin was applied to furnish, then dried and the plant shut down for several days before that furnish was utilized. Combinations of a pretreat resin and traditional blender resin are also shown.

EXAMPLE 3

Board Study Parameters 1-23/32nd, 38 pcfOSB boardwas made per condition using re-humidifed aspen furnish (~35% mc).

Press temperature was set at 420° F.

Press cycle of 300 seconds, button to button was used on all boards.

Cascophen EW-45LV wax emulsion was applied to all surface layers at 1.7% and all core layers at 1.0% based on solids.

Furnish Treatment

Boards 1 and 2 were pre-treated with an adhesive according to the invention only (12 and 8% respectively), then dried and allowed to sit for three days in a sealed container. These flakes were then treated with the specified amount of surface and core wax in the blender and then formed and pressed.

The remaining boards were subjected to the same as above, with the exception that after the three day waiting period they were treated in the blender with additional resin and wax, then formed and pressed into board. Table 3 summaries the treatment.

Resin Treatments

TABLE 3

| Board # | % Pre-treat | % Blender face resin | % Blender core resin | % Blender face wax | % Blender core wax |
|---|---|---|---|---|---|
| 1 | 12 | 0 | 0 | 1.7 | 1.0 |
| 2 | 8  | 0 | 0 | 1.7 | 1.0 |
| 3 | 12 | 4 | 4 | 1.7 | 1.0 |
| 4 | 8  | 4 | 4 | 1.7 | 1.0 |
| 5 | 6  | 4 | 4 | 1.7 | 1.0 |
| 6 | 4  | 5 | 5 | 1.7 | 1.0 |
| 7 | 6  | 2 | 2 | 1.7 | 1.0 |
| 8 | 4  | 2 | 2 | 1.7 | 1.0 |

Results:
***Note: Board 1 delaminated - we were unable to obtain test specimens for this board.

TABLE 4

All Data

| Board | % Pre-Treat PD-112 resin | % Blender Resin | IB | MOR | MOE | EI | MM | 24 Hr. % WA | % TS | % CS |
|---|---|---|---|---|---|---|---|---|---|---|
| 1 | 12 | 0 | *** | *** | *** | *** | *** | *** | *** | *** |
| 2 | 8  | 0 | 2.9  | 1,076 | 341,109 | 125,975 | 1,108 | 36.9 | 23.3 | 18.1 |
| 3 | 12 | 4 | 42.9 | 4,142 | 596,782 | 211,092 | 4,141 | 27.0 | 5.9  | 3.9  |
| 4 | 8  | 4 | 46.1 | 3,385 | 515,605 | 192,899 | 3,516 | 27.9 | 8.0  | 4.6  |

Non-Oriented columns: IB, MOR, MOE, EI, MM

TABLE 4-continued

All Data

| | | | | | Non-Oriented | | | 24 Hr. | | |
| --- | --- | --- | --- | --- | --- | --- | --- | --- | --- | --- |
| Board | % Pre-Treat PD-112 resin | % Blender Resin | IB | MOR | MOE | EI | MM | % WA | % TS | % CS |
| 5 | 6 | 4 | 40.1 | 3,173 | 543,842 | 185,644 | 3,101 | 26.3 | 6.6 | 3.0 |
| 6 | 4 | 4 | 21.1 | 3,909 | 622,372 | 215,654 | 3,853 | 32.3 | 9.3 | 5.1 |
| 7 | 6 | 2 | 32.6 | 3,940 | 558,222 | 195,356 | 3,914 | 38.8 | 13.1 | 5.1 |
| 8 | 4 | 2 | 22.0 | 2,688 | 478,181 | 178,429 | 2,785 | 72.2 | 31.5 | 28.2 |

*** = Delamination.

As is apparent from the foregoing, the multi-resin addition both prior to and subsequent to drying achieves acceptable quality even if the plant is subject to unanticipated shutdown for three days.

Although we have described our invention in relation to specific embodiments, it will be apparent that our invention is not limited and may be capable of modification by those skilled in the art without departing from the scope of the appended claims.

We claim:

1. A process for making building panels from a mixture of lignocellulosic particles and resin binder, said process comprising:
    obtaining a source of green lignocellulosic particles,
    adding a resin binder to the green particles before the green particles are dried,
    drying the green particles to obtain dried particles,
    consolidating the dried particles under heat and pressure to obtain a building panel, wherein the resin is a phenol formaldehyde resin which is subjected to said drying in the presence of methyol urea.

2. The process of claim 1, including the steps of forming the lignocellulose particles in a flaker and adding said resin binder after said flaker.

3. The process of claim 1, including the steps of storing the lignocellulose particles in a green or wet bin and adding said resin binder to said lignocellulose particles while said particles are conveyed from said bin.

4. The process of claim 1, including the steps of adding said binder incrementally.

5. The process of claim 4, wherein said binder is added after the particles are formed in said flaker, but before storing in a green or wet bin and adding additional binder after said particles are removed from said bin.

6. The process of claim 1, wherein said binder is phenol formaldehyde, to which urea has been added and the methyol urea is formed in situ by the addition of formaldehyde.

7. The process of claim 1, including the step of subsequent pressing the lignocellulose particles to form a consolidated mass from said particles.

8. The process of claim 7, wherein said consolidated mass is in the form of oriented strandboard, high density fiberboard, medium density fiberboard, laminated veneer lumber, chipboard, and plywood.

9. The process of claim 8, wherein said lignocellulose particles are selected from the group of individual fibers, strands up to 12 inches in length, veneers and combinations thereof.

10. The process of claim 1, wherein said step of adding said resin comprises adding said resin in powder form.

11. The process of claim 1, wherein said step of adding said resin comprises adding said resin in liquid form.

12. The process of claim 1, wherein said resin is added at least once between a flaker forming said lignocellulose particles and a drier downstream of said flaker for drying said lignocelluose particles.

13. The process of claim 1, wherein said lignocellulose particles are formed from logs, which logs are previously conditioned in a hot pond or wood yard prior to forming of said particles.

14. A process of assuring the production of building panels comprised of a mass of lignocellulosic particles to which an adhesive has been applied, but dried for an extended period before pressing, said process comprising:
    admixing said lignocellulosic particles and an adhesive comprising phenol formaldehyde;
    drying said particles and adhesive;
    applying additive adhesive to the dried particles and adhesive; and
    consolidating the particles into a mat by subjecting the particles and adhesive to elevated temperatures and pressure for a time sufficient to cure the adhesive.

* * * * *